May 20, 1958     W. H. NEELY     2,835,315
WIRE SPRING STRUCTURE
Filed Sept. 24, 1956     2 Sheets-Sheet 1
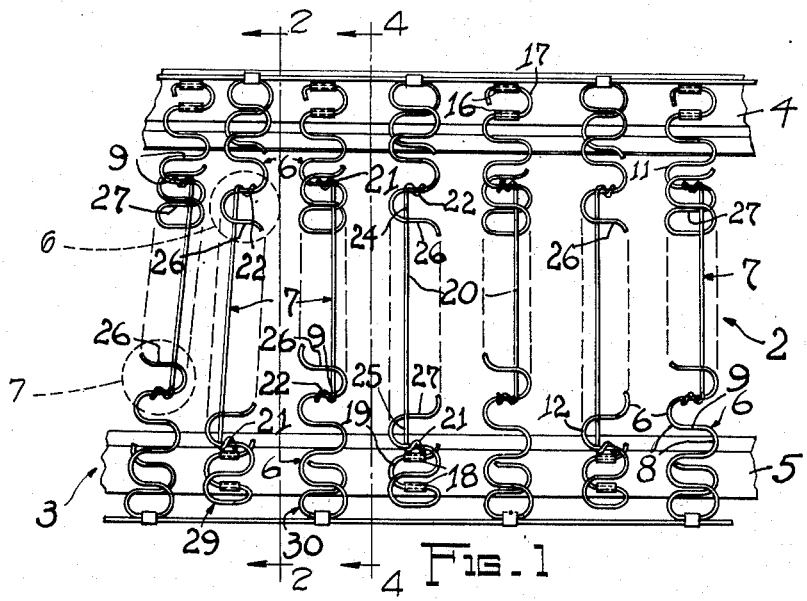
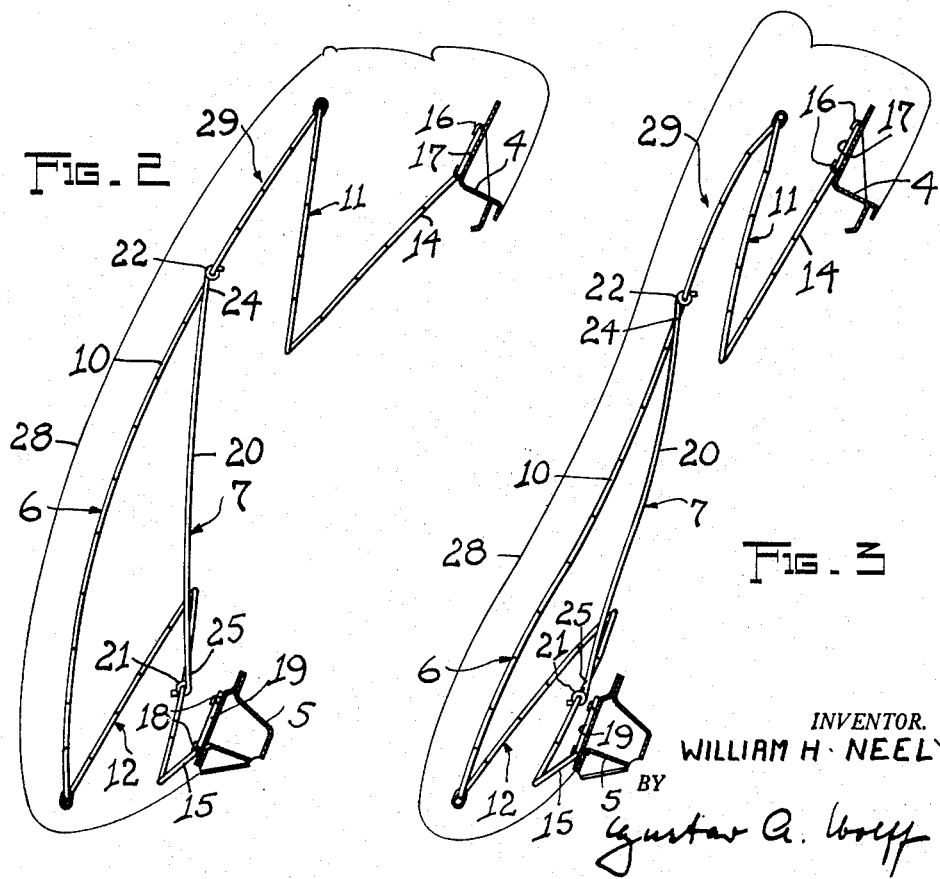
INVENTOR.
WILLIAM H. NEELY
BY
Gustav A. Wolff
ATT.

May 20, 1958 — W. H. NEELY — 2,835,315
WIRE SPRING STRUCTURE
Filed Sept. 24, 1956 — 2 Sheets-Sheet 2

INVENTOR.
WILLIAM H. NEELY
BY
ATT.

United States Patent Office 2,835,315
Patented May 20, 1958

2,835,315

WIRE SPRING STRUCTURE

William H. Neely, Cleveland, Ohio, assignor to The Universal Wire Spring Company, Bedford, Ohio, a corporation of Ohio Application September 24, 1956, Serial No. 611,593

5 Claims. (Cl. 155—179)

This invention relates in general to improvements in upholstered seat back spring constructions assembled from zigzag-shaped or sinuously corrugated wire springs and, more particularly, to seat back spring constructions of this type in which the zigzag-shaped wire springs are individually reenforced by auxiliary wire spring members adapted to contour-shape the wire springs, increase their yielding resistance against load deformation and distribute applied loads for best riding and resting comfort.

Seat back spring constructions of the type above referred to have zigzag-shaped wire springs reenforced by wire spring members embodying a substantially straight wire body portion and angularly offset corkscrew pigtails at the ends of the straight wire body portion. In these seat back spring constructions the auxiliary wire members extend with their pigtail ends from angularly offset V- or N-shaped supporting arms of the zigzag-shaped wire springs and have their other pigtail ends connected to axially aligned cross members of resting portions of the zigzag-shaped wire springs, resulting in stressed areas in the seat back spring constructions.

The primary object of this invention is the provision of a seat back spring construction of zigzag-shaped wire springs which embody resting portions and V- or N-shaped supporting arms and are reenforced by auxiliary wire members selectively alternately extended from opposed supporting arms of the wire springs and removably coupled with cross members of the resting portions of the springs to effect selective distribution of stresses in the resting area of the seat back spring construction.

Another object of the invention is the provision of a seat back spring construction of zigzag-shaped wire springs which are reenforced by substantially straight auxiliary wire spring members alternately coupled in cantilever-like fashion with V- or N-shaped supporting arms at opposite ends of the zigzag-shaped wire springs and connected to cross members of the resting portions of such wire springs.

A further object of the invention is the provision of a seat back spring construction of the type referred to above having auxiliary wire spring members dimensioned for attachment to the resting portions of the springs in areas adjacent central portions thereof to provide the seat back spring construction with a smooth, readily yielding central area.

In addition to above described objects, the invention has other marked improvements and superiorities which radically distinguish it from presently known structures. These improvements or superior characteristics embodying certain novel features of construction are clearly set forth in the appended claims, and the preferred form of embodiment of the invention, as applied to a seat back spring construction, is hereinafter shown with reference to the accompanying drawings forming part of the specification.

In the drawings:

Fig. 1 is a fragmentary front elevational view of a seat back spring construction assembled of wire spring structures with zigzag-shaped wire springs and auxiliary wire spring reenforcing members designed and constructed in accordance with the invention.

Fig. 2 is a sectional view on line 2—2 of Fig. 1, the seat back spring construction being pretensioned.

Fig. 3 is a sectional view similar to Fig. 2 when the seat back spring construction is loaded.

Figure 4:
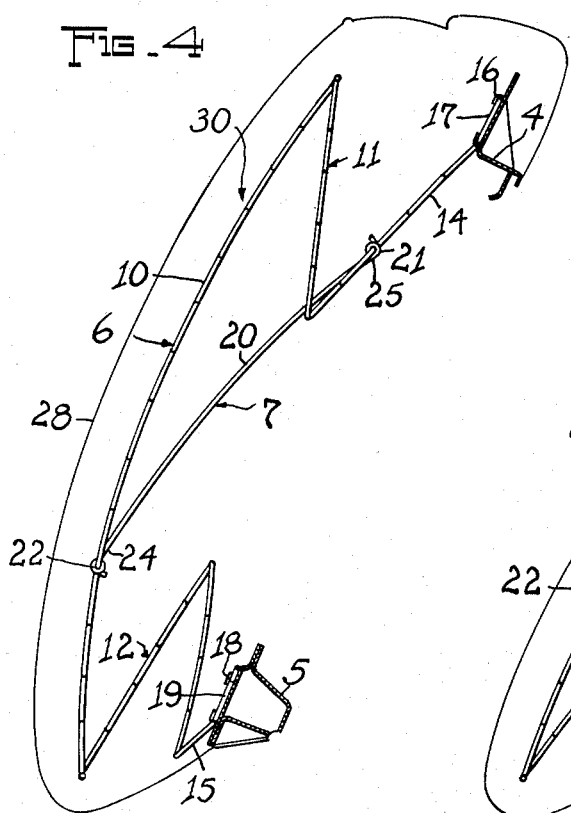
Fig. 4 is a sectional view on line 4—4 of Fig. 1.
Figure 5:
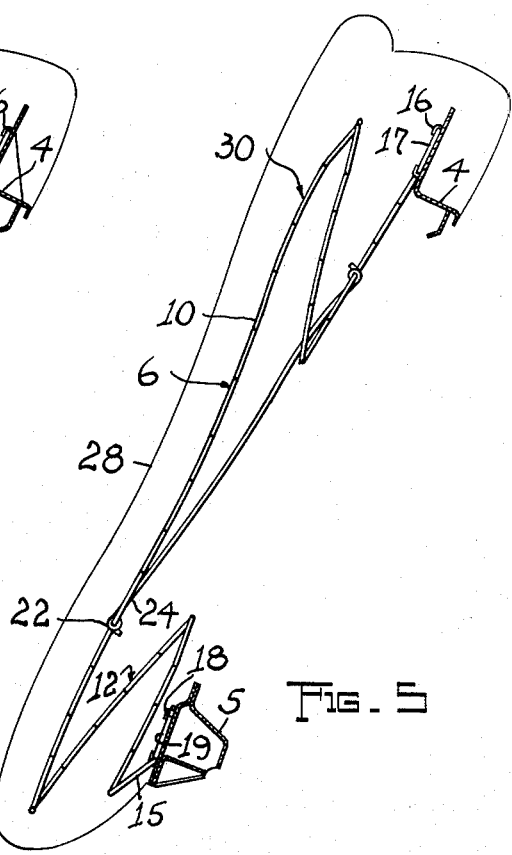
Fig. 5 is a sectional view similar to Fig. 4 when the seat back spring construction is loaded.
Figure 6:
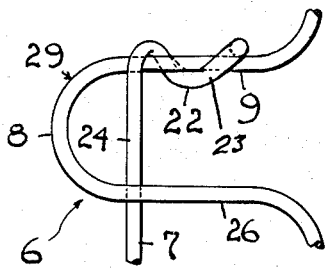
Fig. 6 is an enlarged fragmentary front view of the inner end of an auxiliary wire spring member coupled with a cross member of the wire spring as indicated in Fig. 1.
Figure 7:
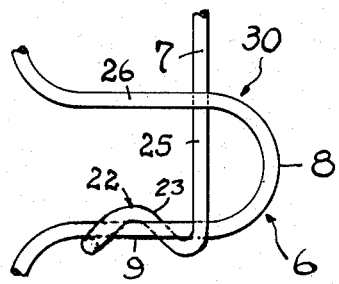
Fig. 7 is an enlarged fragmentary front view of the inner end of another auxiliary wire spring member coupled with cross members of the supporting arm of the wire spring as indicated in Fig. 1.

Referring now to the exemplified form of the invention shown in the drawings, seat back spring construction 2 embodies a frame 3 with a top rail 4 and a bottom rail 5 arranged substantially parallel to top rail 4. Frame 3 is bridged by a plurality of zigzag-shaped wire springs 6 reenforced by auxiliary wire spring members 7 later to be described. Wire springs 6 are made of sinuously corrugated wire having oppositely bent loops 8 successively connected to each other by substantially straight wire cross members 9 and include slightly curved resting portions 10 and resiliently V- or N-shaped accordion fold type supporting arms 11 and 12 extended from opposite ends of resting portions 10 therebeneath, and these supporting arms have their end levers 14 and 15 attached to top and bottom rails 4 and 5.

The wire springs 6 are releasably sprung into engagement with frame 3 by tongue-like struck-up portion 16 in top rail 4 engaging end loops 17 of V-shaped supporting arms 11 and tongue-like struckup portions 18 in bottom rail 5 engaging end loops 19 of N-shaped supporting arms 12. Wire springs 6 which support and hug passengers' backs provide contour shape and proper load-resistance by auxiliary spring members 7, each of which embodies a substantially straight elongated body 20 provided at its opposite ends with laterally extended corkscrew pigtails 21, 22 substantially rectangularly related to body 20. Corkscrew pigtails 21, 22, which may be either left or right-handed, are dimensioned to fit the loop-connecting straight wire cross members 9 of resting portions 10 and V- and N-shaped supporting arms 11 and 12, and for such purpose are provided with coils 23 of approximately one and one-quarter turns and a pitch sufficient to extend such coils over the entire length of wire cross members 9 to provide laterally stable pivotal anchor-like connections between corkscrew pigtails 21, 22 and wire cross members 9.

Preferably, bodies 20 of auxiliary wire spring members 7 are dimensioned to extend with their opposite ends slightly through wire springs 6 when corkscrew pigtails 21 of wire spring members 7 are threaded on respective wire cross members 9 of wire springs 6 to effect under loads contact of end portions 24 and 25 of bodies 20 with cross members 26, 27 adjacent said respective wire cross members 9. This arrangement changes the primarily pivotal connections between auxiliary wire spring members 7 and wire cross members 9 to cantilever-like connections when the seat back spring construction is loaded.

Cantilever-like connections of the type referred to can be effected by preloading or preshaping of springs 6 and their auxiliary wire reenforcing members 7. Thus, end portion 25 (see Fig. 2) is connected in cantilever-like fashion to N-shaped supporting arm 12 when the seat back spring construction is pretensioned by cover 28. Under normal load (see Fig. 3) body 20 of wire spring member 7 assumes S-shaped form. Changing of the pivotal connections of auxiliary wire spring members 7 with wire springs 6 to cantilever-like connections are controlled by a change in length or cross section of auxiliary wire spring member 7 and a change in the location of the coupling between auxiliary wire spring members 7 and wire springs 6 to adjust the seat back spring construction 2 to any desired shape and load-characteristic.

Resiliency, flexibility and contour of seat back spring construction 2 are controlled by the resistance offered by torsioning and twisting the loop-connecting wire cross members 9 and bending the auxiliary wire spring members 7. Thus, by positioning cantilever-like anchorage of the wire spring members 7 in different positions on supporting arms 11 and 12 of wire springs 6 and changing the length of wire spring members 7 other controls may be effected. Selection of the position of cantilever-like connections of wire spring members 7 with wire spring supporting arms 11 and 12 is of importance to obtain the desired stability and flexibility of spring resting portions 10 of the wire spring structures of seat back spring construction 2, so as to avoid excessive shifting of the seat back spring construction 2 under normal and excessive loads. This desired stability, flexibility and spring contour can be obtained by anchoring the one ends of adjacent spring members, or series thereof, alternately to top and bottom supporting arms 11 and 12 of wire springs 6 as disclosed in the seat back spring construction 2 shown in the drawings, in which wire spring structures 29 include auxiliary wire spring members 7 anchored in cantilever-like fashion to the N-shaped bottom supporting arms 12 of wire spring 6, and wire spring structures 30 have the wire spring members 7 anchored in cantilever-like fashion to the V-shaped top supporting arms 11 of wire springs 6. It should be noted that reenforced wire spring structures 29 have their auxiliary wire spring members 7 anchored to supporting arms 12 close to the bottom rail 5 and wire spring structures 30 have auxiliary wire spring members 7 anchored to the supporting arms 12 in an area spaced substantially from top rail 4 to attain the desired different yielding actions in upper and lower areas of resting portions 10 of wire spring structures 29 and 30 respectively.

Axial length of wire spring members 7 is designed to provide seat back spring construction 2 with a central readily yielding area extending substantially opposite the hollow of the back of a person seated on the seat back spring construction. This area extends midway between the inner ends of wire spring members 7 and their connections with wire cross members 9 of resting portions 10 and is created in seat back spring constructions by overlapping the inner ends of auxiliary wire spring members 7 alternately extended singly or in series from top and bottom supporting arms of the wire springs.

Having thus described my invention, what I claim is:

1. In a seat back spring construction having a frame mounting a plurality of wire springs formed with sinuously corrugated resting portions, sinuously corrugated, accordion fold-shaped supporting means at the top and bottom ends of the wire springs and reenforced by elongated straight wire members coupling their resting portions with accordion fold-shaped supporting means, wherein some wire springs have the resting portions coupled with accordion fold-shaped top supporting means, wherein other wire springs have the resting portions coupled with accordion fold-shaped bottom supporting means, and wherein the elongated straight wire members each include a hooked end portion extended through the resting portion of a wire spring between two adjacent cross members thereof and hooked over one of the two adjacent cross members to effect in a loaded condition of the wire spring contact of the end portion of the elongated straight wire member with the other one of the two adjacent wire cross members for cantilever-like coupling of the elongated straight wire member with the resting portion of the sinuously corrugated wire spring.

2. A seat back spring construction as described in claim 1, wherein the elongated wire spring members of the wire spring structures are extended beyond the central areas of the resting portions of the wire springs of the wire spring structures to overlap with respect to each other in adjacent wire springs and provide the seat back spring construction with readily yielding prelocated resting areas.

3. In a seat back spring construction having a frame mounting a plurality of wire springs formed with sinuously corrugated resting portions, sinuously corrugated, accordion fold-shaped supporting means at the top and bottom ends of the wire springs and reenforced by elongated straight wire members coupling their resting portions with accordion fold-shaped supporting means, wherein some wire springs have the resting portions coupled with accordion fold-shaped top supporting means, wherein other wire springs have the resting portions coupled with accordion fold-shaped bottom supporting means, and wherein the elongated straight wire members each include a hooked end portion extended through an accordion fold-shaped supporting means between two adjacent cross members thereof and hooked over one of the two adjacent cross members to effect cantilever-like coupling of the straight wire member with the said accordion fold-shaped supporting means.

4. A seat back spring construction as described in claim 3, wherein the elongated wire spring members extended from top supporting arms of wire spring and the elongated wire spring members extended from bottom supporting arms of wire springs are differently spaced from the points of mounting of said wire spring supporting arms on the frame.

5. In a seat back spring construction having a frame mounting a plurality of wire springs formed with sinuously corrugated resting portions, sinuously corrugated, accordion fold-shaped supporting means at the top and bottom ends of the wire springs and reenforced by elongated straight wire members coupling their resting portions with accordion fold-shaped supporting means, wherein some wire springs have the resting portions coupled with accordion fold-shaped top supporting means, wherein other wire springs have the resting portions coupled with accordion fold-shaped bottom supporting means, and wherein said elongated straight wire members include at their opposite ends hooked end portions extended through accordion fold-shaped supporting means and resting portions between adjacent cross members thereof, wherein said hooked end portions are hooked over one of such adjacent cross members to contact the other one when the spring is loaded and effect cantilever-like couplings of said elongated straight wire members with the accordion fold-shaped supporting means and the resting portions of the wire springs.

References Cited in the file of this patent

UNITED STATES PATENTS 2,719,578     Flint                  Oct. 4, 1955